Sept. 26, 1933.  A. C. ELLEY  1,928,416
ELECTRIC MOTOR
Filed June 6, 1932

Inventor.
Alfred C. Elley,
By Cromwell, Greist & Warden
Attys

Patented Sept. 26, 1933

1,928,416

UNITED STATES PATENT OFFICE 1,928,416

ELECTRIC MOTOR

Alfred C. Elley, Beloit, Wis., assignor to Yates-American Machine Company, Beloit, Wis., a corporation of Delaware Application June 6, 1932. Serial No. 615,505

1 Claim. (Cl. 172—36)

The present invention relates to air-cooled electrical devices, such as electric motors, in the operation of which heat is generated requiring dissipation in order to secure most efficient operation.

It is old to provide for the electrical elements, rotor and stator, end shields to protect the same from dust, and to direct air currents over the exterior faces of the shields, depending upon conduction for transmission of the heat from the coils to the shields through the air within the chamber enclosed by the shields.

By my invention the enclosing shields, made of metal of high heat conductivity preferably aluminum and rotating with the motor, are provided both upon their inner and outer faces with integral fan blades, the former serving to agitate the air within the closed chamber and thus by convection facilitate transmission of the heat to the shields, while the latter direct outer air currents over the exterior faces of the shields carrying away the heat. A housing preferably surrounds the motor and is provided with inlet and outlet ports to supply cool air to the outer fan blades and to carry off the heated air.

In order to facilitate an understanding of the principles of the invention, in the accompanying drawing and in the following detailed description is set forth a preferred embodiment of the invention in an electric motor, it being understood that the motor is typical of electrical devices to the cooling of which the invention is adapted.

In the accompanying drawing.

Figure 1:
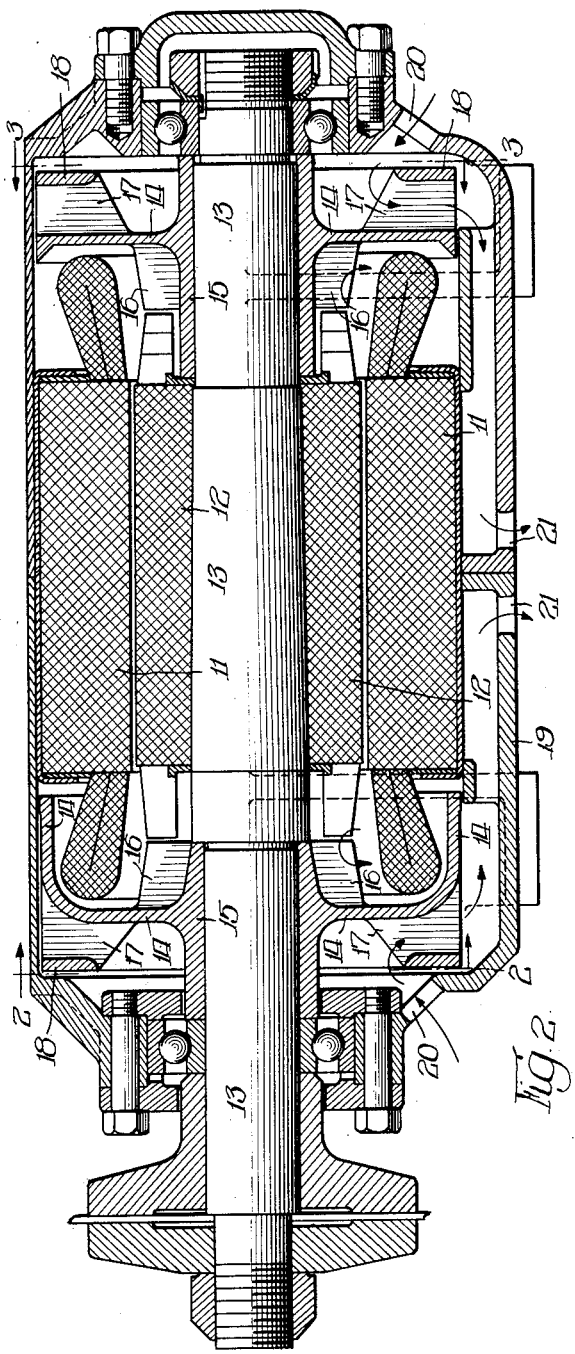
Fig. 1 is a longitudinal section through an electric motor embodying the invention.
Figure 3:
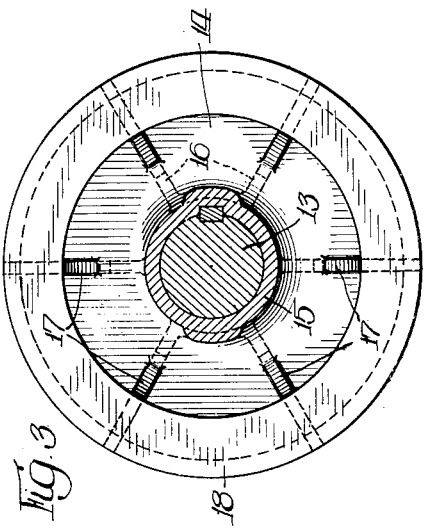
Fig. 3 is a similar section on the line 3—3 of Fig. 1.
Figure 2:
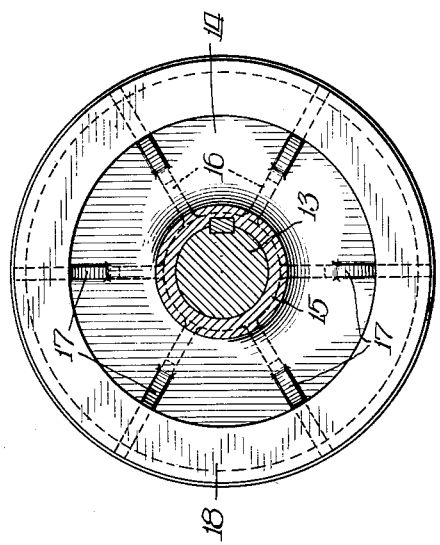
Fig. 2 is a transverse section on the line 2—2 of Fig. 1.

Describing the invention with reference to the drawing, 11 is the stator of the motor, 12 is the rotor, and 13 the shaft upon which the rotor is mounted. End shields 14 are mounted by means of their sleeves 15 upon the shaft 13 to rotate therewith and consequently with the rotor. The shape of the end shields is immaterial. They may be cup-shaped as shown at the left hand end of Fig. 1, or flat as shown at the right hand, the essential characteristic being that they of themselves or with the wall of the housing protectively enclose the electrical elements, rotor and stator, against the admission thereto of dust and the like. Formed integral with the shield castings on the inside thereof and consequently within the chambers enclosed by the shields are fan blades 16, and on the outside of the shield castings are formed fan blades 17 with marginal webs 18, which fan blades revolve with the shields within an outer chamber formed between the shields and the housing 19.

The housing is provided adjacent the shaft axis with air inlet ports 20 and peripherally of the housing with air outlet ports 21, whereby cool air is drawn into the outer chamber at 21 and by means of the fan blades 17 centrifugally projected over the outer faces of the end shields and discharged in a heated condition through the outlet ports 21.

It will be observed that the inner chamber between the end shields and the electrical elements is closed off, and the agitation of the air therein by the blades 16 serves to assist in the transmission of the heat to the shields, whence it is drawn off by the cool air current sweeping over the outer face thereof. Thus in operation heat generated by the electrical elements is more quickly transmitted to the end shields and by them transferred to the cooling air currents for dissipation than under former practice where the outer faces of the shields only were subjected to the cooling air current and the air within the shields remained substantially quiescent.

I claim:

In an air-cooled motor, a casing provided with air inlets and outlets, a shaft journaled in the casing, a rotor mounted on the shaft, a stator carried by the casing, and an air-circulating member positioned in the casing adjacent the air inlets in sealing relation to the rotor and stator; said member being characterized by an elongated cylindrical sleeve which fits over and is secured to the shaft at one end of the rotor, an integrally formed disk which extends radially from the sleeve intermediate the ends of the latter, a plurality of integrally formed blades which extend radially from the inner end of the sleeve and axially from the inner face of the disk and terminate short of the inner periphery of the stator, a plurality of integrally formed blades which are radially disposed with respect to the outer end of the sleeve in spaced opposition to the latter and extend axially from the outer face of the disk, and an integrally formed ring which is connected with the edges of the last mentioned blades in spaced parallel relation to the outer periphery of the disk.

ALFRED C. ELLEY.